June 30, 1931.                J. L. ANDERSON                1,811,835
                    PORTABLE CUTTING AND WELDING MACHINE
                    Filed Nov. 12, 1930        7 Sheets-Sheet 6
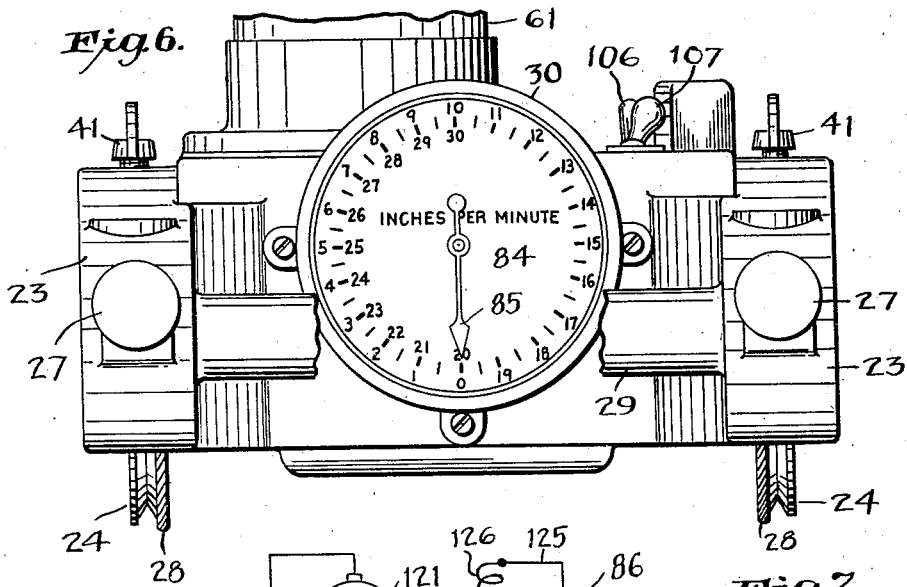
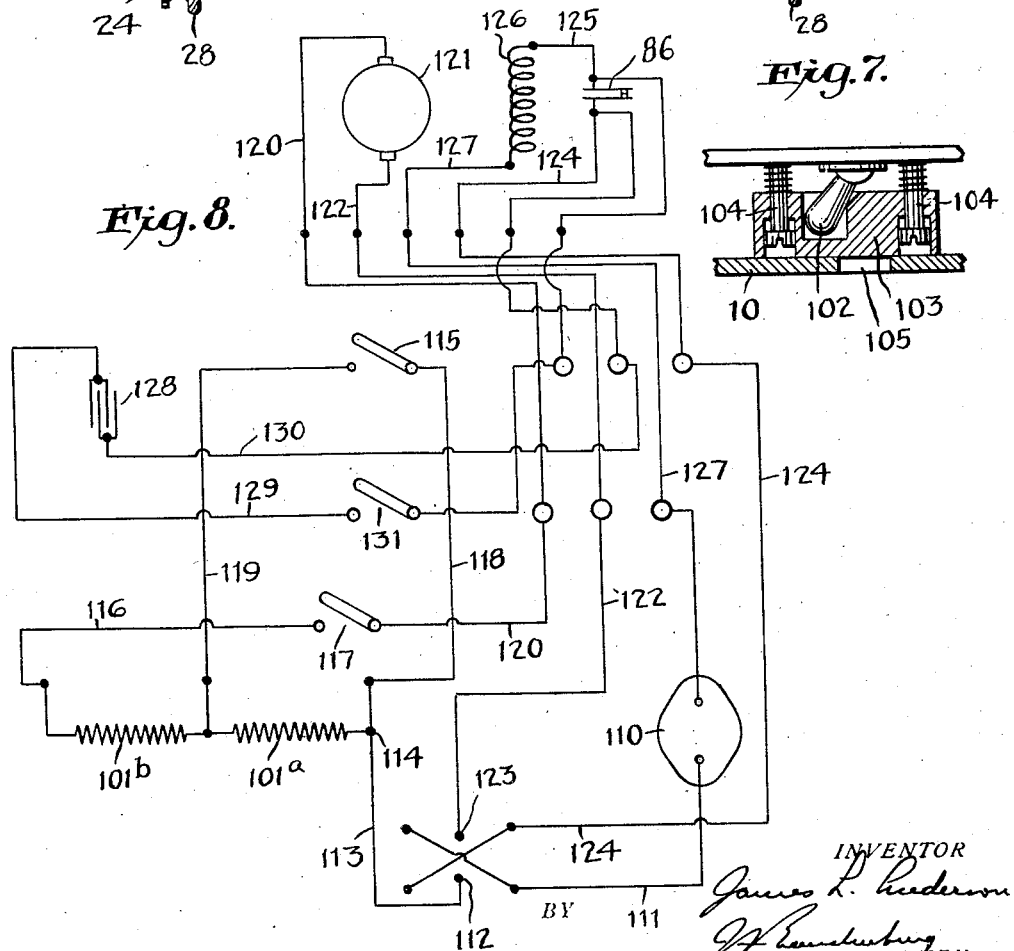
INVENTOR
James L. Anderson
BY
ATTORNEY

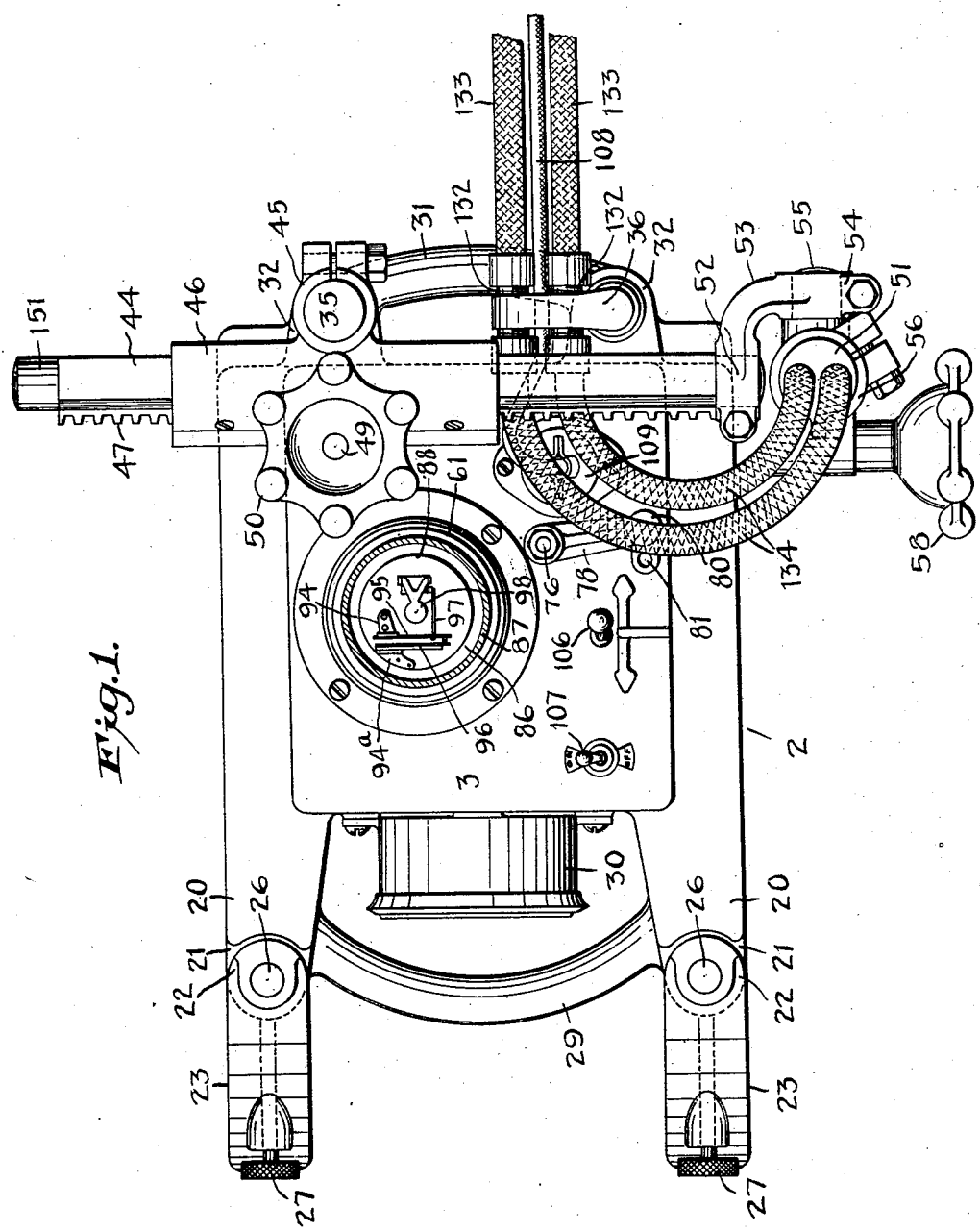

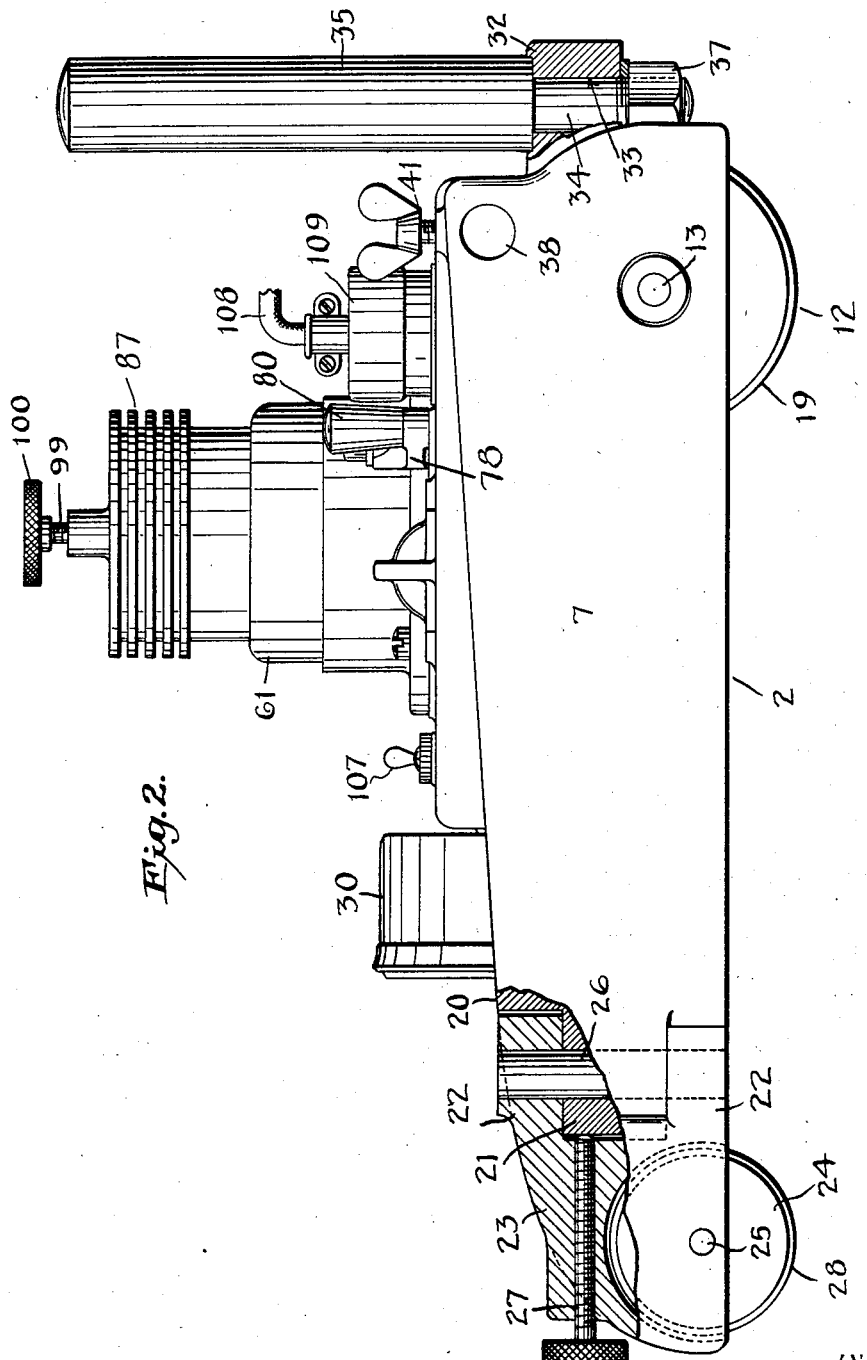

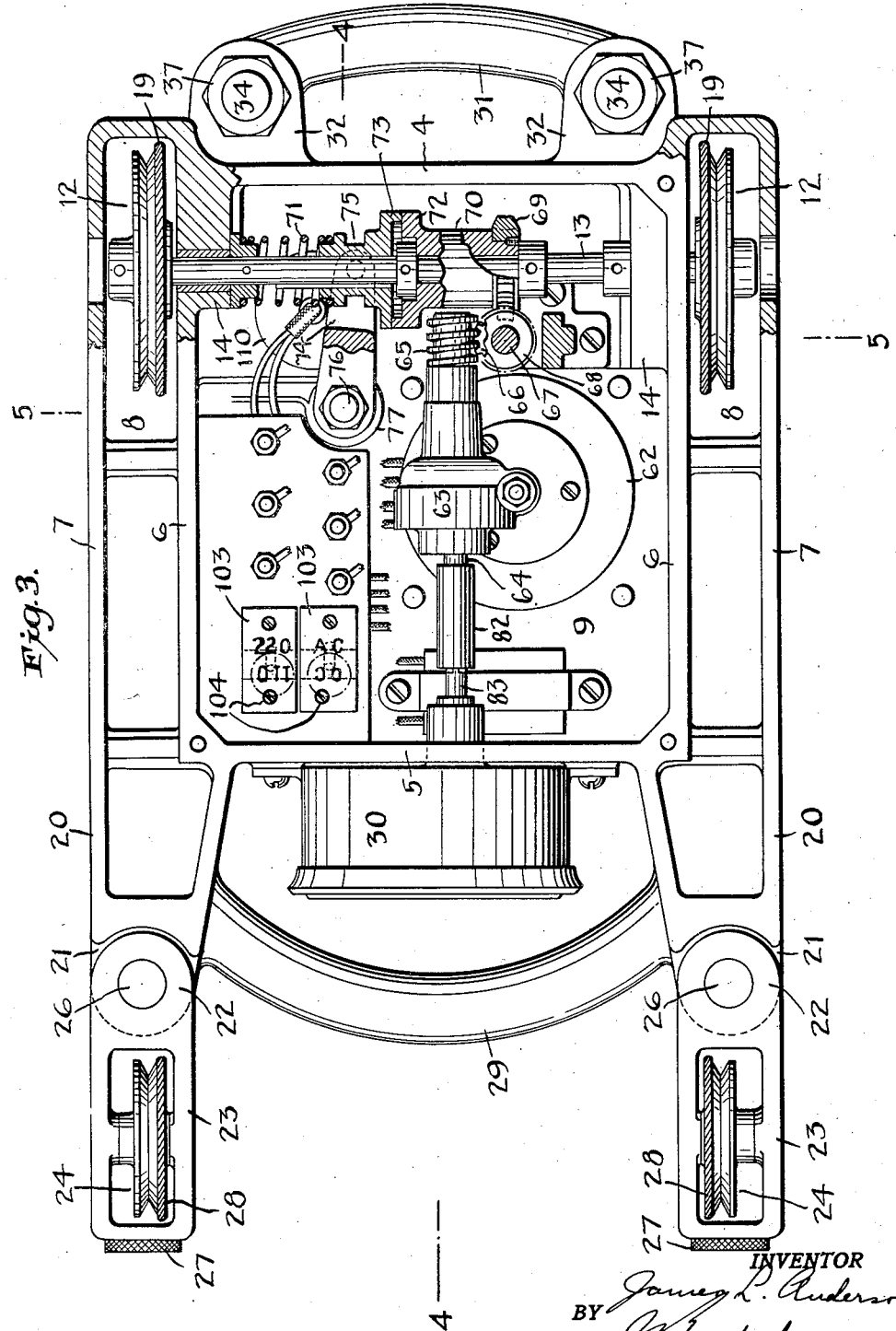

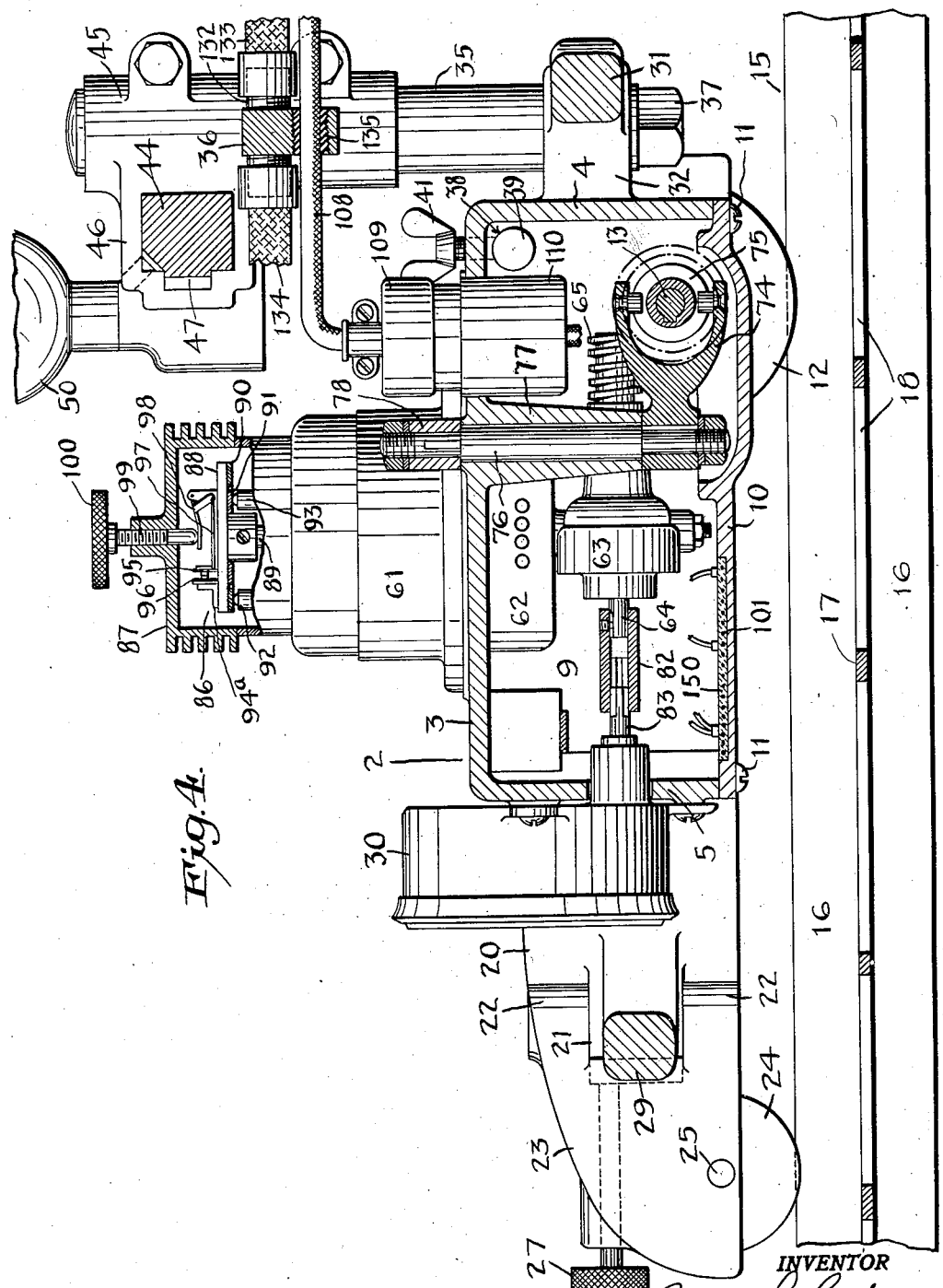

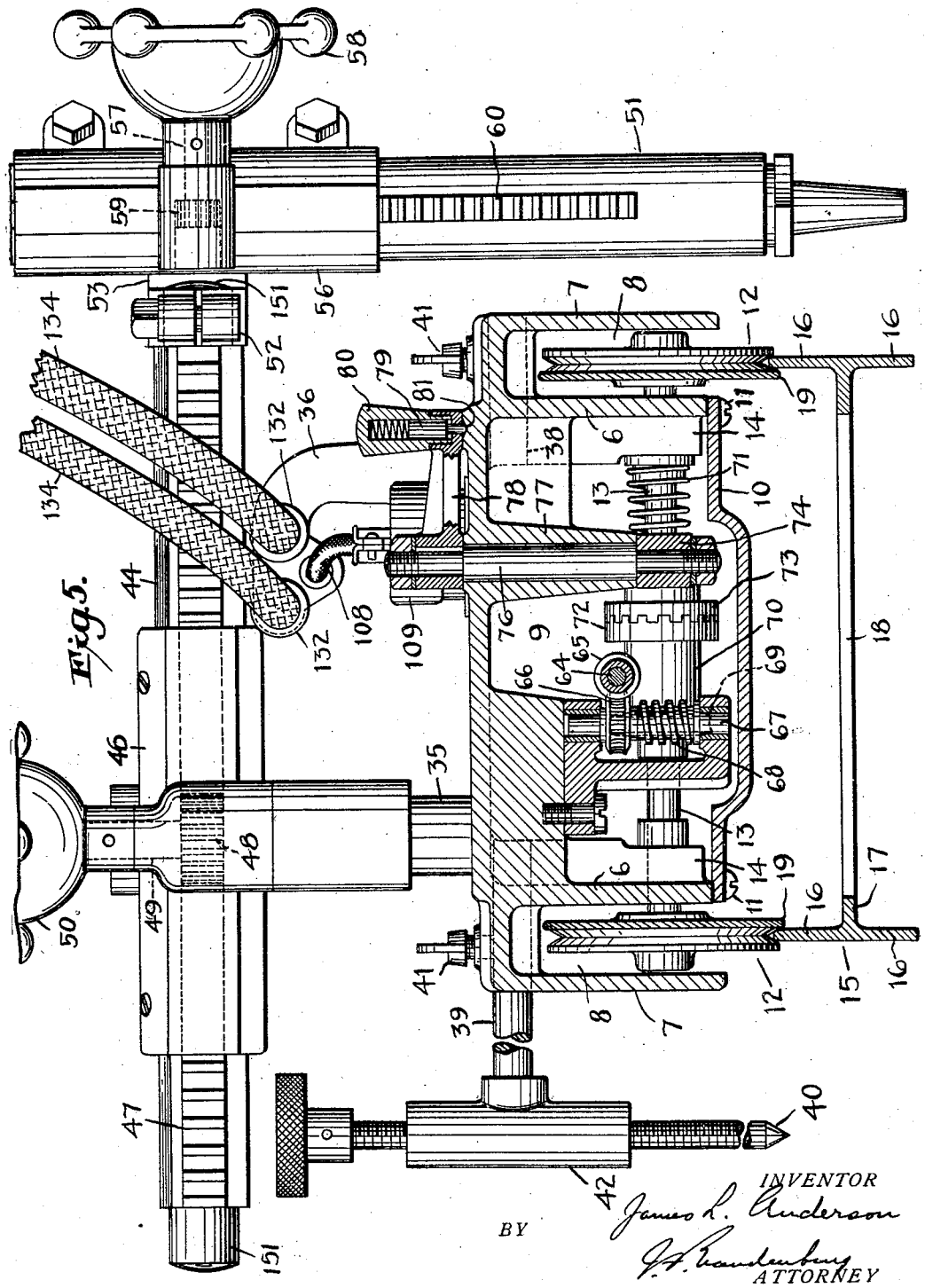

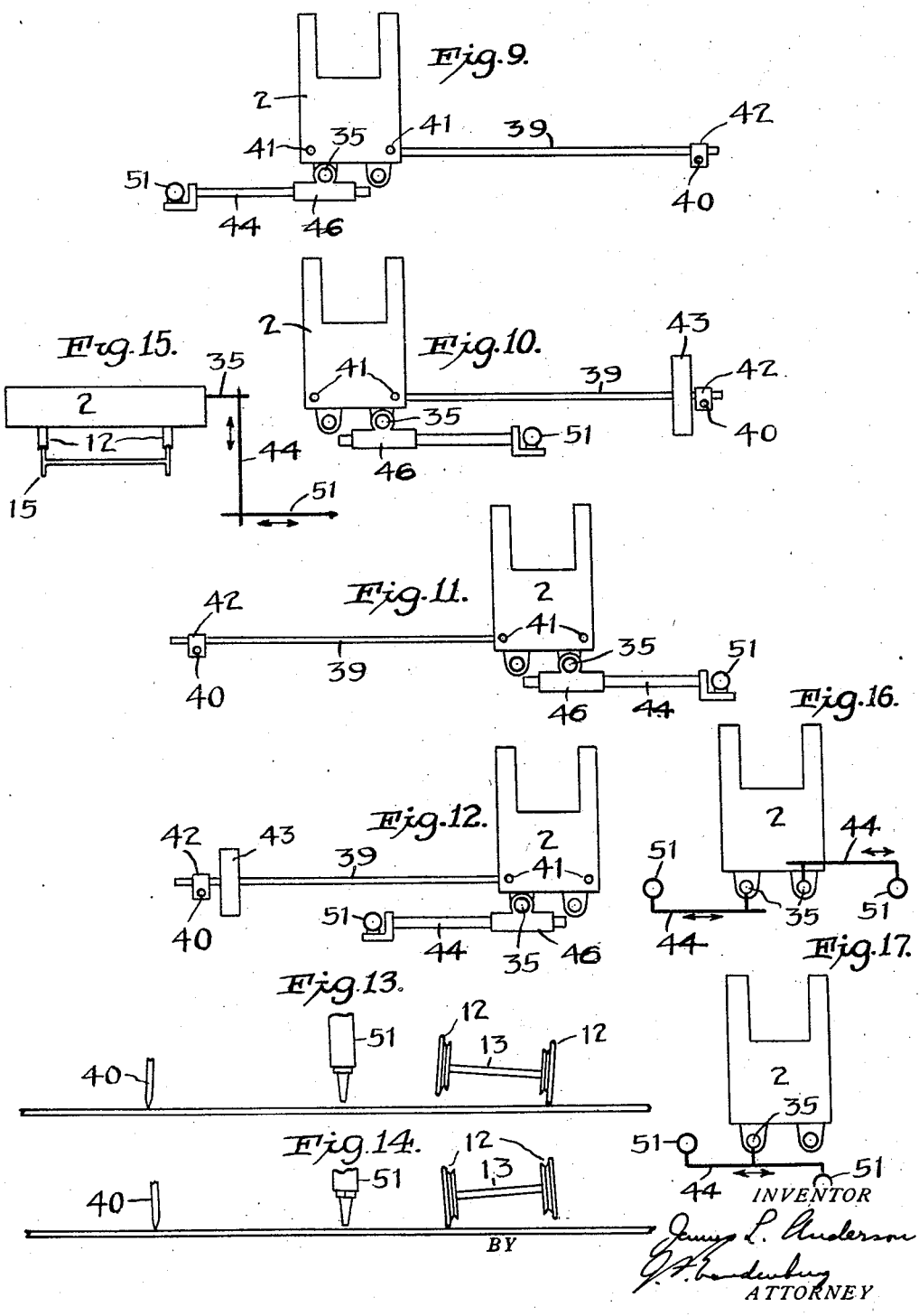

Patented June 30, 1931

1,811,835

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

PORTABLE CUTTING AND WELDING MACHINE

Application filed November 12, 1930. Serial No. 495,047.

The invention relates to the type of machine for cutting or welding metals consisting of a small, portable, self-supporting, wheeled torch-carriage, motor-driven and adapted to travel on a track or on the surface of the work, or other underlying surface. For straight-line work the carriage is usually mounted on a track. For circular work, a radius rod having a cutter is applied to the carriage and set so that the carriage will travel in an arc on two wheels at one side of the carriage.

It is customary to provide the carriage with a torch-arm by means of which the torch can be adjusted at various distances outward from the side of the carriage. In straight-line cutting this enables a series of cuts to be made parallel with each other without disturbing the setting of the track, and in general it enables the carriage to be operated along a course at such distance from or degree of proximity to the line of cut or weld as may be most convenient under the particular conditions. For circular work the adjustment of the torch position relatively to the carriage and to the center is an aid in performing circular cutting or welding on arcs of different radius. Various radii can be secured either by adjusting the center or by adjusting the torch, or by adjusting both, but hitherto the construction of these machines has confined the torch to a position at the opposite side of the carriage from the torch or in front of the carriage.

In straight-line cutting, the lateral adjustment of the torch secured by a laterally overhanging torch arm having means for adjusting the arm or the torch in the direction of the length of the arm, makes possible offset cuts and various irregular and angular cuts, as by stopping the motor which drives the carriage, manually running the torch out to make a cut deviating from the former cut, and then restarting the motor so as to carry the cut onward along a new line.

Such machines have had wide use for executing a variety of straight-line and circular cutting including combinations of such cuts, and they are also suitable for welding by substituting a welding torch for a cutting torch.

An object of the present invention is greatly to extend the range of usefulness of a machine of this character.

The success and economy of cutting metal by means of gases is dependent upon the maintenance of exact speed adjusted to the oxygen consumption for the particular thickness of metal. Adjusted regulation and maintenance of speed is no less important for welding. Previously, adjustable friction regulators have been employed in connection with the electric motors which drive these machines, but the control thus obtainable is only approximate and it has been impossible to hold the speed constant notwithstanding fluctuations in line voltage. Change-speed gearings have been resorted to in order to secure a range of cutting speeds, but the range has been inadequate and the adjustment of speed to a particular set of conditions has been difficult and uncertain and dependent on the judgement of the operator.

In the present machine the electric motor is connected with the drive wheels by an irreversible reducing gearing of fixed ratio, and the motor is governed by a centrifugal make-and-break governor having an adjustable control which enables the torch-carriage to be driven at any speed variable by continuous increments from about two inches a minute to about thirty inches, with perfect uniformity at any speed for which it may be adjusted.

Another feature of the invention is the provision of a clutch having an operating control on the outside of the carriage and operable to connect and disconnect the drive to the wheel supports at a point between the drive wheels and an irreversible gearing driven by the motor. A translation-speed indicator is connected with the drive in a manner to be operated when the clutch is open and the motor running with the carriage at rest, as well as when the carriage is traveling.

In this way very important advantages are realized. The motor and drive can be started and adjusted to a given cutting or welding speed shown by the indicator while the carriage is stationary, and the gases can then be turned on through the torch and the clutch thrown in to start the carriage and torch in movement at the predetermined speed practically at once.

Adjustment of the cutting or welding speed to a rate shown by the indicator makes possible more effective and economical work than could be performed with the former machines in which it was necessary to adjust the speed during the travel of the carriage according to the appearance of the operation to the eye of the operator.

Together with these controls, switches are provided for not only turning on and off current to the motor but also for reversing the direction of the motor.

It is therefore possible to move the present machine at regulated speed either forward or backward, and to arrest the movement at any point, where the torch may be displaced laterally by hand to make a cross-cut to a point where motor-driven cutting is resumed in either the forward or backward direction. Furthermore, by throwing out the clutch, the carriage can be moved freely in either direction notwithstanding the irreversible gearing. Heretofore, it has been necessary either to lift and carry the machine, or to slide it with its wheels locked, from one position to another, in setting up the machine on its track or in spotting the torch on the work, operations which were laborious and detrimental to the machine.

Another object of the invention is to provide a machine which is inherently counterbalanced against the weight of the overhanging torch and adjustable torch arm, and in which all driving mechanism is enclosed away from slag. The body of the machine is low hung and very broad between the wheels in comparison with it height, and is constructed as a box-like casting with a removable closure plate to contain the driving mechanism, all of which is disposed close to the horizontal plane through the live axle, the motor itself being set vertically into an opening in the top wall of the body. At the top of the motor is the centrifugal make-and-break governor with its adjusting knob.

Lateral compartments of the integral body are provided to shroud forward drive wheels, the live axle of which passes through the main compartment containing all the drive gearing. The trailing wheels are also shrouded in carriers, which are swivel-jointed to brackets projecting from the rear corners of the box body.

Heretofore, it has been customary to have a single trailing wheel, trailing behind one of the forward driving wheels, but in the present machine a four-wheel support is provided, not merely for stability but in order that the carriage can be constrained to circular movement on two wheels at one side or at the other, at will.

For circle cutting it is necessary to apply a radius rod having a center, and to adjust the center so as to lift the near wheel support off the work or other underlying surface. Heretofore, machines of this class have been designed to support the torch outward from one side of the carriage, or in front of the carriage, while the radius rod was attachable to project from the opposite side of the carriage.

In the present machine, the radius rod is attachable so as to dispose the center at either side of the carriage, and preferably, also, the torch-arm is positionable and adjustable so that the torch can be carried at either side of the machine at will, and so that the torch and the center can be placed at any desired distance from or degree of proximity to each other. This enables various circle-cutting operations to be performed which would otherwise be difficult or impossible, and enables the speed of movement of the torch to be increased or decreased with respect to the speed of the driving wheels. For example, with a long radius and the drive wheel between the center and the torch, the torch must travel at a speed greater than the carriage, whereas with a short radius and both the torch and the center at the same side of the drive wheel the speed of the torch is less than that of the carriage. By tilting the carriage so that its rolling support is confined to the drive wheel and trailing wheel at one side or at the other as the case may be, the utility of the machine for circular cutting is greatly extended.

Furthermore, the interchangeable and adjustable positioning of torch and center at the same side or at opposite sides of the machine, or reversely, enables the machine to travel either inside or outside the arc of a cut or weld, which is of advantage in the cutting of rings and for other purposes, and enables various conditions to be taken into account, such as whether it is desirable that the carriage is to run on the work or on some other surface.

In order to increase the versatility of the machine, the adjustable torch arm is constructed at both ends to receive a torch-carrier. Thus, the torch can be carried at either end of the torch arm, or two torches can be carried in laterally spaced relation on the carriage.

Furthermore, two vertical mountings, laterally spaced on the carriage, are provided for a post or posts to support a torch-arm or torch-arms. A single arm is mountable interchangeably on these posts, depending on the position desired for the torch, or two arms with torches can be carried simultaneously. A plurality of parallel cutting or welding operations can thus be carried on simultaneously.

The torch-arm post is likewise interchangeable in the horizontal radius-rod sockets, this arrangement of the post and torch-arm facilitating numerous cutting and welding jobs with work of various kinds and in different relations to the track on which the carriage travels for straight-line operations.

A bracket designed to secure the torch hose, and preferably also the electrical cable, is attachable to one or other of the vertical mountings which may be available. This rigid anchorage for the hose keeps the torch arm from being swung or disturbed in case the attendant should fail to keep free the hose lines between the machine and the gas cylinders.

Other objects, features and advantages of the machine will be apparent to those skilled in the art from the following description and from a consideration of the accompanying drawings illustrating the preferred embodiment of the invention.

In the said drawings:

Fig. 1 is a plan view of the machine, showing it equipped with a single torch arm and with a hose-securing bracket. The positions in which these are mounted can be interchanged. Neither the radius rod which is applied for circular cutting, nor the track used for straight cutting, is shown. The superstructure casing on the motor which houses the regulator is in horizontal section.

Fig. 2 is a side elevation of the machine without torch arm, hose bracket or radius rod, and showing a portion broken away and in section.

Fig. 3 is a bottom plan view, with the bottom plate removed and portions in section.

Fig. 4 is a vertical longitudinal section taken on the line 4—4 of Fig. 3, showing the torch arm and the hose bracket in the same relative positions as in Fig. 1. The track is shown in this view.

Fig. 5 is a vertical transverse section taken on the line 5—5 of Fig. 3, also showing the track.

Fig. 6 is a rear elevation of the machine, with the superstructure of the motor broken away.

Fig. 7 is a detail sectional view.

Fig. 8 is an electrical diagram.

Figs. 9–17 are diagrams indicating some of the numerous arrangements of the machine and its attachments for straight-line and circular work.

The body 2 of the torch-carriage of the machine comprises a broad and low hollow casting formed with a top wall 3, front and rear walls 4, 5 and side walls 6. Spaced outwardly from these side walls are other depending walls 7 to form lateral compartments 8. The main compartment 9 is closed at the bottom by a removable plate 10, which is held to the walls 4, 5 and 6 by screws 11. This compartment houses all the mechanism for driving the carriage, protecting it from slag resulting from cutting or welding operations.

Shrouded in the lateral compartments 8 are two driving wheels 12, located forwardly. These wheels are fixed to the opposite ends of a live axle 13, which extends across the forward, lower portion of the interior of the main compartment of the body to revolve in bearings 14 in the inner side walls 6.

The peripheries of these wheels are grooved to operate on a special type of track 15 consisting of a one-piece structural section presenting a pair, or pairs, of parallel flanges 16 serving as rails, connected by a web 17 having openings 18 cut out of it, for lightening and to afford hand-holds. The section preferably has two sets of flanges projecting at opposite sides of the web, either pair of flanges being adapted to be the rails while the other pair rest firmly upon any available underlying support or supports. Such a track is sufficiently light, yet so rigid that it can be effectively used as a solid way for the torch carriage when spanning distant supports after the manner of a beam.

One flange of each wheel, preferably the inner flange 19, is of larger diameter than the other flange and is knurled, to facilitate operations in which the wheels, or one of them, travels directly on the surface of the work.

Projecting rearward from the main body 2 of the torch-carriage, at opposite sides, are two rigid brackets 20 formed to provide lugs 21, which are embraced by lugs 22 of trailing-wheel carriers 23. These carriers are constructed to shroud two trailing wheels 24, each secured in its carrier by an axle 25.

The members of the sets of lugs 21, 22 are pierced by vertical pintles 26 forming hinge connections. The trailing wheel carriers, thus connected to the body, can be locked with the trailing wheels in line with the forward driving wheels, or at any desired angle, by means of thumb-screws 27 which are threaded through the carriers to bear against the lugs 21.

The peripheries of the wheels 24 are grooved like the peripheries of the driving wheels for engagement with the track, and their inner flanges 28 are of larger diameter than the outer flanges and are preferably knurled for rolling on a plane surface.

The brackets 20 are joined by an integral rib 29, which is spaced a considerable distance away from the outside of the rear wall 5 of the boxed body of the carriage. This rib is not only a strengthening member but also serves as a carrying handle and as a protection for a translation-speed indicator 30, which is applied to the back of the carriage in the space between it and the rib.

Another rib 31 joining two laterally spaced lugs 32 projecting forward from the body 2 affords a handle at the front in addition to that at the back of the machine.

Each of the front lugs 32 is formed with a vertical socket hole 33 (Fig. 2), adapted to receive a stem 34 on the lower end of a torch-arm post 35 or a similar stem on the lower end of a hose and cable bracket 36. The lower end of the stem is threaded in each case to receive a nut 37 by means of which the post or the bracket is removably clamped in place. The post and the bracket are interchangeable in the lugs, so that the torch-arm post can be disposed in vertical position toward either side of the carriage depending upon the conditions of the operation to be performed, the bracket being placed in the other available position. Two torch-arm posts may be supplied with the machine and may both be mounted in the vertical sockets for certain operations, the bracket being then removed from the machine.

Transverse radius-rod sockets 38 present openings at both sides of the body 2 preferably at its upper forward region. These sockets may, and preferably do, permit a radius-rod 39 to be passed entirely through the body if necessary, but in any event they make it possible to insert the radius-rod at either side of the machine, so that the carriage can be caused to describe arcs about the center 40 located at either the right or the left of the machine. The radius-rod is shown in only a fragmentary way in Fig. 5, but it will be understood that it is of considerable length. The distance of the center 40 from either side of the carriage is adjusted by moving the rod in or out, and the rod is clamped in any desired position by two thumb-screws 41 associated with the radius-rod sockets.

The center is movable vertically in a holder 42 fixed to the rod (or adjustable thereon), the stem of the center being preferably screw-threaded to engage an internal screw-thread in the holder. The center can be screwed down to bear on the surface of the work, or other surface, and by further screwing to lift the near wheels of the carriage off the surface. On the other hand, the center can be screwed up and, a weight 43 (Fig. 12) having been applied to the rod, the far wheels can be lifted.

For most circular or circular-arc cutting the wheels nearer the center are lifted off the underlying surface so that the carriage travels on the wheels at the farther side. Because the center can be disposed outboard from either side of the carriage, the machine can be operated to cut or weld in either clockwise or counter-clockwise directions. It is important, therefore, that the carriage be provided with four-wheel support rather than the customary three-wheel support, and that both of the rear wheels have swivel mountings.

The radius-rod sockets 38 and the vertical sockets 33 in which the torch-arm post or posts 35 are usually mounted are preferably made of the same size, so that a torch-arm post can be clamped in a laterally projecting position in one of the radius-rod sockets. There are various operations for which this is desirable.

The torch-arm 44 is removably applied to the torch-post by a split clamp fitting 45 which is formed with a transverse guide holder 46 through which the torch-arm is slidable. The torch-arm is usually carried in a transverse position over the forward part of the carriage, on a post 35 mounted vertically in one or the other of the sockets 33 in the laterally spaced lugs 32. The arm 44, which like the interior of its guide is preferably rectangular in cross-section, is provided on one face with a rack 47 meshed by a pinion 48 (Fig. 5) on a shaft 49 which is rotatable in the guide and has a handle 50. By turning this handle the torch-arm can be shifted in the direction of its length, to position the torch 51 nearer to or farther from the side of the carriage, or to make cross cuts, and also, in circular cuttings, to vary the distance between the torch and the center 40.

In former torch-arms of this character, the torch could be carried at one end only of the arm, whereas the present arm is constructed to carry the torch at either end, or to carry two torches at its opposite ends, thereby enlarging the capabilities of the machine. Accordingly, both ends of the arm are formed with cylindrical seats 151 adapted to receive the clamp socket 52 at one end of an elbow fitting 53 of known form. The clamp socket 54 at the other end of this elbow receives stud 55 projecting laterally from the torch-holder 56, also of known construction. A shaft 57 (Fig. 5), rotatable in this holder by means of a hand-wheel 58, has a pinion 59 meshing a rack 60 on the torch for the purpose of adjusting the torch in the direction of its length. As the torch is usually carried, this adjustment raises or lowers the torch, but the torch can be disposed at various inclinations or even horizontally. The hinge joints at 52 and 54 permit of any desired angular adjustment.

The encased electric motor 61 which drives the machine is disposed with its armature shaft vertical and extending downward in the main chamber 9 of the enclosed low-hung body 2. The motor is set into an opening in the top wall 3 with its lower portion 62 sunk into the chamber, so that the center of gravity of the motor is as low as possible.

An encased worm-gear unit 63 connects the downwardly extending armature shaft, which will be understood as being enclosed in this unit, with a short shaft 64 which is disposed horizontally in a fore and aft direction in the mechanism chamber 9.

On the front end of this shaft there is a worm 65 which engages a worm-wheel 66 on a short vertical disposed shaft 67. This shaft carries another worm 68 which drives a worm-wheel 69 on a barrel 70 loosely mounted on the drive axle 13, but held against longitudinal motion thereon. One end of this barrel is formed with teeth, or otherwise, to constitute one element 72 of a clutch. A shiftable clutch element 73, feathered on the axle, is normally pressed by a spring into engagement with the clutch element 72, to close the driving connection between the axle and the irreversible reducing gearing driven by the motor.

The clutch element 73 can be shifted manually to open the driving connection, and for this purpose a fork 74 engaging a grooved collar 75 of said element is fixed to the lower end of a vertical control shaft 76 journaled in a bearing 77 extending downward from the top wall 3. The upper end of this shaft extends above the top wall and has a clutch control arm 78 in a convenient position for operation. A spring-pressed pin 79 in the handle knob 80 of this arm will engage non-positively with a depression 81 on the top of the carriage, to hold the clutch in the open condition.

It will be observed that all of the drive mechanism between the motor and the drive wheels 12 is arranged at a low level, close to the horizontal plane through the drive axle.

The rear end of the shaft 64 is connected by a coupling 82 with the shaft 83 of the speed indicator 30. This speed indicator is built like a tachometer and special illustration of its mechanism is therefore unnecessary. Its dial 84 is marked to show by the position of the indicator hand 85 cutting or welding speeds up to thirty inches a minute, or as much higher as may be desired. The range of cutting speeds with this machine may be from about two inches to about thirty inches a minute.

In order to hold the speed uniform at any value and to make is possible to adjust the speed instantly and accurately, the motor 61 is provided with a particular form of governor 86, which is housed in a light superstructure 87 on top of the motor. This governor has a plate 88 which is secured to the upper end 89 of the armature shaft and which carries on its under side two conductor rings 90 and 91 contacted by two brushes 92 and 93 included in the motor circuit.

Two brackets 94 and 94ª on top of the plate 88 are electrically connected with the rings 90 and 91, respectively, and secured to these brackets are two spring blade arms 95 and 96 having contact points at their ends which normally touch each other. The blade 95 is limited in its movement by a link 97 connected to a bell-crank lever 98, one arm of which is acted upon by a speed-adjusting screw 99 threaded through the top of the superstructure 87 and having a readily accessible operating knob 100.

When the motor is in operation centrifugal force acts on the make-and-break arms 95 and 96 of the governor, and when the speed is high enough, depending upon the adjustment of the screw 99, the arm 96 is moved away from the arm 95, momentarily breaking the motor circuit. The result of this is to keep the speed from increasing or to cause it to slacken imperceptibly, whereupon the contact points of the arms touch each other again, restoring the circuit and sustaining the speed. By these slight fluctuations in the circuit, the speed of the motor is held remarkably uniform at any value to which the governor may be adjusted by the screw. The linear speed of the carriage being shown on the indicator 30, the operator is not left to judge the speed at which cutting or welding is to be conducted.

The resistors consisting of conductors 101 are embedded in enamel 150 baked in a recess in the upper surface of the bottom plate 10, to be connected in circuit with the motor for operation on either 110 or 220 volt circuits. The motor may also be adapted to operate on either direct or alternating current. Switches may be provided inside the housed body for setting the motor to operate on either kind of current and on either voltage. The arm 102 of one of these switches is shown in Fig. 7. The arms of these switches are locked in one position or the other by recessed blocks 103 held in place by screws 104. The two switch-locking blocks are shown in Fig. 3, one bearing designations for 110 and 220 volts and the other for A. C. and D. C. current. By reversing each block end for end, the corresponding switch can be locked in a different position. The designations on the under faces of the blocks being visible through windows 105 in the bottom plate, plain indication of the setting of the motor circuits is afforded.

The manner in which the embedded resistors 101 are incorporated and made integral with the bottom plate 10 of the carriage is a matter of importance. The considerable amount of heat given off by these resistors is developed at a region removed from parts which might be adversely affected, and the entire bottom plate serves as an extended heat dissipator and as a conductor of heat to the body of the carriage, where it is further dissipated.

The motor is a reversible motor, and the handle 106 of a reversing switch is disposed on the top wall of the body. This switch might also be a stopping switch, but it is preferable to provide a separate starting and stopping switch having a handle 107, also projecting from the top wall of the body. The switch controls 106 and 107 and the clutch control 78 are disposed in proximity to each other in exposed positions so as to provide for convenient and certain manipulation.

The current is brought in through a cable 108 attached to a plug 109 which is inserted in a receptacle 110 in the top wall of the body of the carriage.

It will be convenient at this point to refer to the wiring diagram, Fig. 8. Assume that the current passes from the receptacle 110 by way of wire 111 to the reversing switch, and that this switch is in such position that the current passes to contact 112. It proceeds along wire 113 to the connection point 114. If the voltage switch 115 is open, which would be the case if this switch is set for operation of the motor on a 220 volt circuit, the current will proceed from point 114 through both resistors 101$^a$ and 101$^b$, and by way of wire 116 to the starting and stopping switch 117. If the switch 115 is closed, the current will proceed from point 114 by way of wire 118 to the switch 115 and thence to wire 119, thence through resistor 101$^b$ only (the 110 volt resistor), to wire 116 and thus to the starting and stopping switch 117. In either case the current passes from switch 117 by way of wire 120 to the armature 121 of the motor, through this armature to wire 122 to contact 123 of the reversing switch 112, to wire 124, thence to the contacts of the centrifugal make-and-break governor 86, thence by wire 125 to the field 126 of the motor, and thence by wire 127 back to the receptacle 110.

A condenser 128 is connected in shunt with the contacts of the governor 86 by wires 129 and 130. The A. C., D. C. current switch 131 in conductor 129 is closed when the motor is to operate on one of these kinds of current and is open when the machine is set to operate on the other kind of current.

When the reversing switch is thrown to the other position, the path of the current through the armature is reversed, and the armature consequently rotates in the reverse direction, to drive the carriage forward or backward as the case may be.

The hose bracket 36 which has been referred to in an earlier part of the specification has two double-ended hose nipples 132 fixed in it. The ends of these nipples at one side of the bracket receive the ends of supply hose 133 for oxygen and combustible gas respectively. The other ends of the nipples take the ends of short hose lengths 134, which are connected at their opposite ends to the torch. This hose bracket securely mounted on the body of the carriage and having the hose fixed to it keeps any pull on the supply hose from moving the torch.

The hose bracket is also preferably provided with a thimble 135 through which the cable 108 is passed.

The mode of operation of the machine and its capabilities will be apparent to those skilled in the art. Certain of the advantages of the invention and certain of the operations which can be performed have been set forth and others will be obvious from the description and drawings.

Figs. 9 to 17 illustrate schematically some of the possible adjustments and operations. Fig. 16 shows the possibility of executing parallel cuts or welds with two torches 51 on two torch arms 44 applied to two of the torch-arm posts 35 mounted vertically in the laterally spaced sockets at the front of the carriage. The arrows indicate adjustment of the arms to vary the distance between the cuts or welds. In this particular case the hose-bracket 36 would be removed from the carriage. In Fig. 17 two torches are carried at opposite ends of the same torch arm.

Fig. 15 illustrates a use of the machine in which a torch-arm post 35 is applied to one of the radius rod sockets so as to project laterally from the machine. The torch-arm 44 is indicated as extending downward, and the torch 51 as projecting laterally from the lower end of the arm, to operate below the carriage on work which may be disposed vertically. The arrows indicate adjustments of the torch-arm and of the torch. In such a case the arm 44 can also be disposed vertically above the post, to support the torch in an elevated position. Numerous other dispositions of the torch and various adjustments thereof, vertically, horizontally, or angularly, are obtainable.

Figs. 9 and 11 illustrate circular cutting or welding with the torch and center at opposite sides of the machine, the positions of the torch and center being reversed in these two views with respect to the two sides of the machine. In these cases the carriage travels inside of the arc of the cut or weld.

In Figs. 10 and 12 the carriage moves outside the arc described by the torch jet or jets. In Fig. 10 both torch and center are at the right-hand side of the carriage and in Fig. 12 both are at the left-hand side. The adjustability of the torch arm and of the radius rod and center make it possible to propel the jets in arcs varying from those of small radius to those of long radius. It will be observed that by placing the torch and center at the same side of the machine arcs of very short radius can be cut. Thus, in Figs. 10 and 12 the torch and center can be brought much closer together than has been shown for purpose of illustration.

The center can be screwed up or down to cause the carriage to travel circularly either on the pair of wheels nearer to the center or on the pair of wheels farther from the center. For the former purpose a weight 43 may be used to weight the center down and to lift the far wheels.

Figs. 13 and 14 illustrate two possible dispositions of this kind. In Fig. 13 the wheels nearer to the center are lifted from the work or other support and the carriage rolls upon the far wheels. The ratio of the torch speed to the wheel speed is as the ratio between the distance from the torch to the center to the distance from the far wheels to the center. In Fig. 14 the carriage travels on the wheels nearer the center, the far wheels being lifted and carried idly. In this instance, obviously, the torch speed is higher in relation to the wheel speed. This finds practical application, for example, in cases in which circles or arcs of fairly small radius are to be cut. With the torch and center placed on the same side of the machine, and the machine therefore traveling outside the arc of cutting, the speed at which the torch can be moved around its smaller circle is necessarily less than the speed at which the carriage is driven. If the maximum speed at which the wheels can be revolved would produce a speed at the torch too low for efficient cutting when the carriage travels on the far wheels as in Fig. 13, the carriage can be tilted as in Fig. 14 to travel on the nearer pair of wheels, thereby securing a substantial gain in speed for the torch.

The machine is useful for a great variety of straight-line cutting and welding operations, or for making cuts which include both straight lines and curves.

While the preferred embodiment of the invention has been described in detail, it will be understood that numerous changes may be made without departing from essentials. The torch which has been represented may be either a cutting torch or a welding torch, or a combined welding and cutting torch. By the substitution of an electrode, the machine may be used for electric welding.

I claim:

1. A machine for cutting or welding of metals, comprising the combination of a portable wheeled torch-carriage capable of traveling on a track or on the surface of the work, a motor in the carriage, an adjustable speed regulator associated with the motor, a drive mechanism through which said motor drives part of the wheel support of the carriage, a translation-speed indicator connected with the drive mechanism, and a manually operable clutch interposed between said mechanism and the driven part of the wheel support to connect and disconnect the same from the drive while said indicator remains connected.

2. A machine for cutting or welding of metals, comprising the combination of a portable wheeled torch-carriage capable of traveling on a track or on the surface of the work, a motor in the carriage, an adjustable speed regulator associated with the motor, a drive mechanism including an irreversible gearing through which said motor drives part of the wheel support of the carriage, a manually operable clutch interposed between said irreversible gearing and the driven part of the wheel support, and a translation speed indicator connected with the drive mechanism at the other side of said gearing from the clutch.

3. A machine for cutting or welding of metals, comprising the combination of a portable wheeled torch-carriage capable of traveling on a track or on the surface of the work, an electric motor on the carriage, a governor driven by the motor and controlling the motor circuit, a device for adjusting said governor to obtain any desired uniform speed within a continuous extended range of speed adjustments, and reducing gearing through which said motor drives part of the wheel support of the carriage.

4. A machine for cutting or welding of metals, comprising the combination of a portable wheeled torch-carriage capable of traveling on a track or on the surface of the work, an electric motor on the carriage, a governor driven by the motor and controlling the motor circuit, a device for adjusting said governor to obtain any desired uniform speed within a continuous extended range of speed adjustments, a drive mechanism through which said motor drives part of the wheel support of the carriage, and a translation-speed indicator connected with said drive mechanism.

5. A machine for cutting or welding of metals, comprising the combination of a portable wheeled torch-carriage capable of traveling on a track or on the surface of the work, an electric motor on the carriage, a governor driven by the motor and controlling the motor circuit, a device for adjusting said governor to obtain any desired uniform speed within a continuous extended range of speed adjustments, drive mechanism including an irreversible gearing through which said motor drives part of the wheel support of the carriage, a manually operable clutch interposed between said irreversible gearing and the driven part of the wheel support, and a translation-speed indicator having a connection with the drive mechanism unaffected by the operation of said clutch.

6. A machine for cutting or welding of metals, comprising, in combination, a portable wheeled torch-carriage capable of traveling on a track or on the surface of the work, a reversible electric motor in said carriage, a drive mechanism including an irreversible gearing through which said motor drives part of the wheel support of the carriage, switch controls for turning on and off the current to the motor and reversing its direction of rotation, and a manually operable clutch interposed between said irreversible gearing and the driven part of the wheel support of the carriage.

7. A machine for cutting or welding of metals, a portable wheeled torch-carriage capable of traveling on a track or on the surface of the work and having provisions for an overhanging torch-arm and a radius rod, the body of said carriage being very low in comparison with its width between the wheels, a live axle extending across the forward part of the carriage to turn two of said wheels, a motor placed low in the carriage, and mechanism extending from said motor to drive said axle, all of said drive mechanism lying close to the horizontal plane through said axle.

8. A machine for cutting or welding of metals, comprising a portable wheeled torch-carriage capable of traveling on a track or on the surface of the work and having provisions for an overhanging torch arm and a radius rod, a live axle extending across the forward part of the carriage to turn two of the wheels, a motor placed in said carriage with its armature shaft extending downward within the carriage behind said axle, and gearing between said shaft and axle, all lying close to the horizontal plane through the axle.

9. A machine for cutting or welding of metals, comprising a portable wheeled torch-carriage capable of traveling on a track or on the surface of the work and having provisions for an overhanging torch arm and a radius rod, a live axle extending across the forward part of the carriage to turn two of the wheels, a motor in said carriage, drive mechanism comprising irreversible gearing between said motor and said axle, a clutch on said axle for connecting and disconnecting the same with said drive mechanism and an operating device on the outside of the carriage connected with said clutch.

10. A machine for cutting or welding of metals, comprising a portable wheeled torch-carriage capable of traveling on a track or on the surface of the work, a motor on the carriage, a constant-speed-ratio drive from said motor to part of the wheel support of the carriage, an adjustable governor for the motor, and a translation-speed indicator operated by said drive.

11. A machine for cutting or welding of metals, comprising a portable torch-carriage having a broad box-like body enclosing a main compartment and lateral compartments, said body having a top wall, depending side and front walls surrounding the main compartment and additional outwardly spaced walls to form the lateral compartments, a motor over the main compartment, a bottom plate applied to the walls of the main compartment, driving wheels in said lateral compartments, and mechanism in the main compartment for driving said wheels from said motor.

12. A machine for cutting or welding of metals, comprising a portable wheeled torch carriage having a body provided with a pair of laterally-spaced rearwardly-projecting brackets, trailing wheel-carriers hinge-jointed to said brackets, and a rib uniting said brackets and constituting a handle.

13. A machine for cutting or welding of metals, comprising a portable motor-driven wheeled torch-carriage having a body provided with a pair of laterally-spaced rearwardly projecting brackets, trailing-wheel carriers hinge-jointed to said brackets, a translation-speed indicator mounted on the back of the body, and a handle rib uniting said brackets in a protecting position behind said indicator.

14. A machine for cutting or welding of metals, comprising a portable motor-driven wheeled torch-carriage having a body, and ribs spanning the ends of said body and serving as handles.

15. A machine for cutting or welding of metals, comprising a portable motor-driven wheeled torch-carriage, a translation-speed indicator mounted on the back of the body of the carriage, and a handle rib spanning the back of the body and protecting said indicator.

16. A machine for cutting or welding of metals, comprising, in combination, a portable wheeled torch-carriage having a pair of forward wheels, a pair of trailing wheels, carriers for said trailing wheels hinge-jointed to the body of the carriage, a motor drive for the forward wheels, a radius rod, and provisions for attaching said radius rod so that the carriage can be constrained to travel about a center at one side of the carriage or at the other as desired.

17. A machine for cutting or welding of metals, comprising a portable wheeled torch-carriage having a box-like body with mechanism housed therein for driving part of the wheel support of the carriage, an electric motor set in said body with its armature shaft vertical and extending downward to drive said mechanism, and a centrifugal make-and-break regulator on top of said motor and provided with an adjusting knob.

18. A machine for cutting or welding of metals, comprising a portable wheeled torch-carriage having an integral box-like body divided by walls into a main compartment and lateral compartments, a closure for said main compartment, a motor on the body, a pair of driving wheels shrouded in said lateral compartments, mechanism housed in the main compartment for driving said wheels from said motor, a pair of shrouds hinge-jointed at the rear end of the body, and trailing wheels mounted in said shrouds.

19. A machine for cutting or welding of metals, comprising, in combination, a portable wheeled motor-driven torch-carriage having laterally-spaced vertical sockets, an adjustable torch-arm to support a torch at various distances from the carriage, and a post to carry said torch arm, said post mountable interchangeably in said sockets.

20. A machine for cutting or welding of metals, comprising, in combination, a portable wheeled motor-driven torch-carriage having laterally spaced mounts, an adjustable torch-arm, and a hose-securing bracket, said torch-arm and said hose-securing bracket being interchangeable on said mounts.

21. A machine for cutting or welding of metals, comprising, in combination, a portable wheeled motor-driven torch-carriage, and a transverse torch-arm on the carriage adjustable in the direction of its length and constructed at both ends to receive a torch-carrier or torch-carriers.

22. A machine for cutting or welding of metals, comprising, in combination, a portable wheeled motor-driven torch-carriage, laterally spaced mounts thereon, a transverse torch-arm adjustable in the direction of its length and applicable interchangeably to said mounts, said torch arm constructed at both ends to receive a torch-carrier or torch-carriers.

23. A machine for cutting or welding of metals, comprising, in combination, a portable wheeled motor-driven torch-carriage having vertical and horizontal sockets, a post applicable to either a vertical or a horizontal socket, and a torch-arm on such post adjustable in the direction of its length.

24. A machine for cutting or welding of metals, comprising, in combination, a portable four-wheeled motor-driven torch-carriage, a radius-rod with center and means to so receive said rod as to constrain the carriage to circular movement about the center at either side of the carriage.

25. A machine for cutting or welding of metals, comprising, in combination, a portable four-wheeled motor-driven torch-carriage, means for supporting a torch outward from either side of the carriage, a radius-rod with center and means to so receive said rod as to constrain the carriage to circular movement about the center at either side of the carriage.

26. A machine for cutting or welding of metals, comprising, in combination, a portable four-wheeled motor-driven torch-carriage, a radius rod with center, means to so receive said rod as to constrain the carriage to circular movement on either pair of wheels about the center disposed at adjustable distances at either side of the carriage, an adjustable torch-arm, and means for supporting said torch-arm to carry the torch at adjustable distances from either side of the carriage.

27. A machine for cutting or welding of metals, comprising, in combination, a portable four-wheeled motor-driven torch-carriage, a radius rod with center applicable to said carriage, an adjustable torch-arm, means to so receive said torch-arm as to support the torch either at the opposite side of the carriage from the center or at the same side therewith, and means on the torch-arm to adjust the torch to any desired distance from or degree of proximity to the center.

28. A machine for cutting or welding of metals, comprising a portable wheeled torch-carriage having a box-like body, a motor in said carriage, mechanism in said body for driving part of the wheel support from said motor, an electrical system in the body for operating said motor either on direct or alternating current at different voltages, shiftable switches in the body to connect the motor for different currents and voltages, and means for locking said switches and showing from the outside of the body the condition for which they are set.

29. A machine for cutting or welding of metals, comprising a portable wheeled torch carriage carrying an electric motor and drive mechanism for connecting said motor with part of the wheel support of the carriage, said carriage having a box-like body housing said mechanism, a removable plate applied to the bottom of said body, and resistors in electrical relation to the motor, said resistors being incorporated in an integral manner with said bottom plate.

JAMES L. ANDERSON.